United States Patent
Elmore et al.

(10) Patent No.: US 9,341,712 B2
(45) Date of Patent: May 17, 2016

(54) VARIABLE RESOLUTION UNCERTAINTY EXPERT SYSTEM FOR DIGITAL BATHYMETRY DATABASE

(75) Inventors: Paul A. Elmore, Slidell, LA (US); David H. Fabre, Stennis Space Center, MS (US); Raymond T. Sawyer, Stennis Space Center, MS (US); Rodney W. Ladner, Stennis Space Center, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1236 days.

(21) Appl. No.: 13/106,085

(22) Filed: May 12, 2011

(65) Prior Publication Data
US 2011/0282636 A1 Nov. 17, 2011

Related U.S. Application Data

(60) Provisional application No. 61/333,795, filed on May 12, 2010.

(51) Int. Cl.
*G06F 7/60* (2006.01)
*G06F 17/10* (2006.01)
*G01S 15/89* (2006.01)
*G01S 7/53* (2006.01)

(52) U.S. Cl.
CPC .. *G01S 15/89* (2013.01); *G01S 7/53* (2013.01)

(58) Field of Classification Search
None
See application file for complete search history.

(56) References Cited

U.S. PATENT DOCUMENTS 5,608,689 A * 3/1997 Capell, Sr. ............... 367/87

OTHER PUBLICATIONS

Elmore et al., Uncertainty Estimation of Historical Bathymetric Data from Bayesian Networks, 2009, Naval Reserach Laboratory, pp. 1-8.*
Hassan et al., Using Markov Chain Monte Carlo to quantify parameter uncertainty and its effect on predictions of a groundwater flow model, Elsevier, pp. 749-763.*
Heckerman, D., A Tutorial on Learning With Bayesian Networks, Microsoft Technical Report, MSR-TR-95-06, Mar. 1995.
IHO Standards for Hydrographic Surveys, 5th Edition, Special Publication No. 44, International Hydrographic Bureau, Monaco, Feb. 2008.
Zho, Qiming, and Liu, Xuejun, Error Analysis on Grid-Based Slop and Aspect Algorithms, Photogrammetric Engineering & Remote Sensing, vol. 70, No. 8, pp. 957-962, Aug. 2004.
Plant, Nathaniel G., et al., Analysis of the scale of errors in nearshore bathymetric data, Marine Geology 191 pp. 71-86, Elsevier Science B.V., 2002.
Jakobsson, Martin et al., On the effect of random errors in gridded bathymetric compilations, Journal of Geophysical Research, vol. 107, No. B12, 2358, 2002.

(Continued)

*Primary Examiner* — Saif Alhija
*Assistant Examiner* — Bernard E Cothran
(74) *Attorney, Agent, or Firm* — US Naval Research Laboratory; Scott G. Bell (57) ABSTRACT

System and method for estimating uncertainty by obtaining conditional probability densities of bathymetric uncertainty due to navigation error and bottom slope using a Monte Carlo technique, using the Monte Carlo results to train a Bayesian Network to provide the causal relationships of navigation error and bottom slope to bathymetric uncertainty, producing a histogram of bathymetric uncertainty from the Bayesian Network of the uncertainty for an area similar to the training set area, and estimating the uncertainty based on the histogram produced by the Bayesian Network.

15 Claims, 12 Drawing Sheets

(56) References Cited

OTHER PUBLICATIONS

Elmore, Paul et al., U.S. Appl. No. 61/333,795, filed May 12, 2010 entitled Variable Resolution Uncertainty Expert System for Digital Bathymetry Database.

Elmore, P.A. and C.A. Steed, Algorithm Design Study for Bathymetry Fusion—Review of Current State-of-the-Art and Recommended Design Approach. 2008, Naval Research Laboratory: Washington, DC.

Database Design Description for the Digital Bathymetric Data Base—Variable Resolution (DBDB-V), Version 5.2. 2006, Naval Oceanographic Office, Systems Integretion Division: Stennis Space Center, MS.

IHO Standards for Hydrographic Surveys. 5th ed. Special Publication No. 44. 2008, Monaco: International Hydrographic Bureau.

Swain, C., A Fortran IV program for interpolating irregularly spaced data using the difference equations for minimum curvature. Computers and Geosciences, 1976. 1: p. 231-240.

Smith, W.H.F. and P. Wessel, Gridding with continuous curvature splines in tension. Geophysics, 1990. 55(3): p. 293-305.

Russell, S.J. and P. Norvig, Artificial Intelligence: A Modern Approach. 2nd ed. Prentice Hall series in artificial intelligence;. 2003, Upper Saddle River, N.J.: Prentice Hall/Pearson Education. xxviii, 1081 p.

Rennie, S.E., A. Brandt, and N. Plant, A probabilistic expert system approach for sea mine burial prediction. IEEE Journal of Oceanic Engineering, 2007. 32(1): p. 260-272.

Netica, Version 4.0.8. 2008, Norsys Software Corporation: Vancouver, BC. http://www.norsys.com/index.html.

Marsaglia, G. and W.W. Tsang, The Ziggurat Method for Generating Random Variables. Journal of Statistical Software, 2000.

Calder, B., On the uncertainty of archive hydrographic data sets. IEEE Journal of Oceanic Engineering, 2006. 31(2): p. 249-265.

MATLAB, Version 7.8., 2009, The Mathworks Inc.: Natick, MA, http://www.mathworks.com/products/matlab.

Cleveland, W.S., ROBUST locally weighted regression and smoothing scatterplots. Journal of the American Statistical Association, 1979. 74(368): p. 829-836.

Davis, J.C., Statistics and Data Analysis in Geology. 3rd ed. 2002, New York: John Wiley &Sons, Inc.

Merwade, V., Effect of spatial trends on interpolation of river bathymetry. Journal of Hydrology, 2009. 371(1-4): p. 169-181.

Legleiter, C.J. and P.C. Kyriakidis, Spatial prediction of river channel topography by kriging. Earth Surface Processes and Landforms, 2008. 33(6): p. 841-867.

Elmore et al, Uncertainty estimation of historical bathymetric data from mayesian networks, American Geophysical Union presentation, 2010 Ocean Sciences meeting, Portland, OR, Feb. 22, 2010.

Nearshore canyon /experiment bathymetry/topography coastal data information program (CDIP), integrative oceanography division, scripps institution of oceanography, 2009, sccess Jul. 20, 2009 http://clip.ncsc.edu/models/mccx/bathy/raw.

Elmore et al., Use of the ANIAQS mine-hunting system for on-scene bathymetry data, Journal of Marine Systems, in press, doi: 10.1016/j.nharsys.2009.01.040, 2009.

Mark Orzech, NCEX GRID, 1, Nearshore Canyon Experiment Bathymetry and Topography, May 2002.

Elmore, Paul A., U.S. Appl. No. 61/333,795, Variable Resolution Uncertainty Expert System for Digital Bathymetry Database, filed May 12, 2010.

* cited by examiner

| Navigation Mode | Accuracy | Navigation Mode | Accuracy |
|---|---|---|---|
| GPS/SINS (3 or more Satellites) | 10-15 m | NAVSAT/Single Range LORAN/ SINS | 250 m |
| GPS/DR (3 or more Satellites) | 10-15 m | NAVSAT/ SINS | 250 m |
| NAVSAT/Range Range LORAN/SINS | 150 m | NAVSAT/ Single Range LORAN /DR | 250 m |
| NAVSAT/Range Range LORAN/DR | 167 m | NAVSAT/DR | 400 m |
| NAVSAT/Hyperbolic LORAN/SINS | 185 m | LORAN/ SINS<br>LORAN/ DR | 463 m |
| NAVSAT/Hyperbolic LORAN/DR | 222 m | Satellite Altimetry | 7000 m |

GPS: Global Positioning System
SINS: Ship's Inertial Navigation System
DR: Dead Reckoning
NAVSAT: Navy Navigation Satellite System
LORAN: Long Range Navigation
"/": two or more techniques are combined

VARIABLE RESOLUTION UNCERTAINTY EXPERT SYSTEM FOR DIGITAL BATHYMETRY DATABASE

CROSS-REFERENCE TO RELATED APPLICATIONS

This application claims the benefit of priority based on U.S. Provisional Patent Application No. 61/333,795 filed on May 12, 2010, the entirety of which is hereby incorporated by reference into the present application.

BACKGROUND

Devices and methods disclosed herein relate generally to data accuracy, and more specifically, to computing uncertainty for gridded data sets, for example, for historical gridded bathymetry data.

Figure 1:
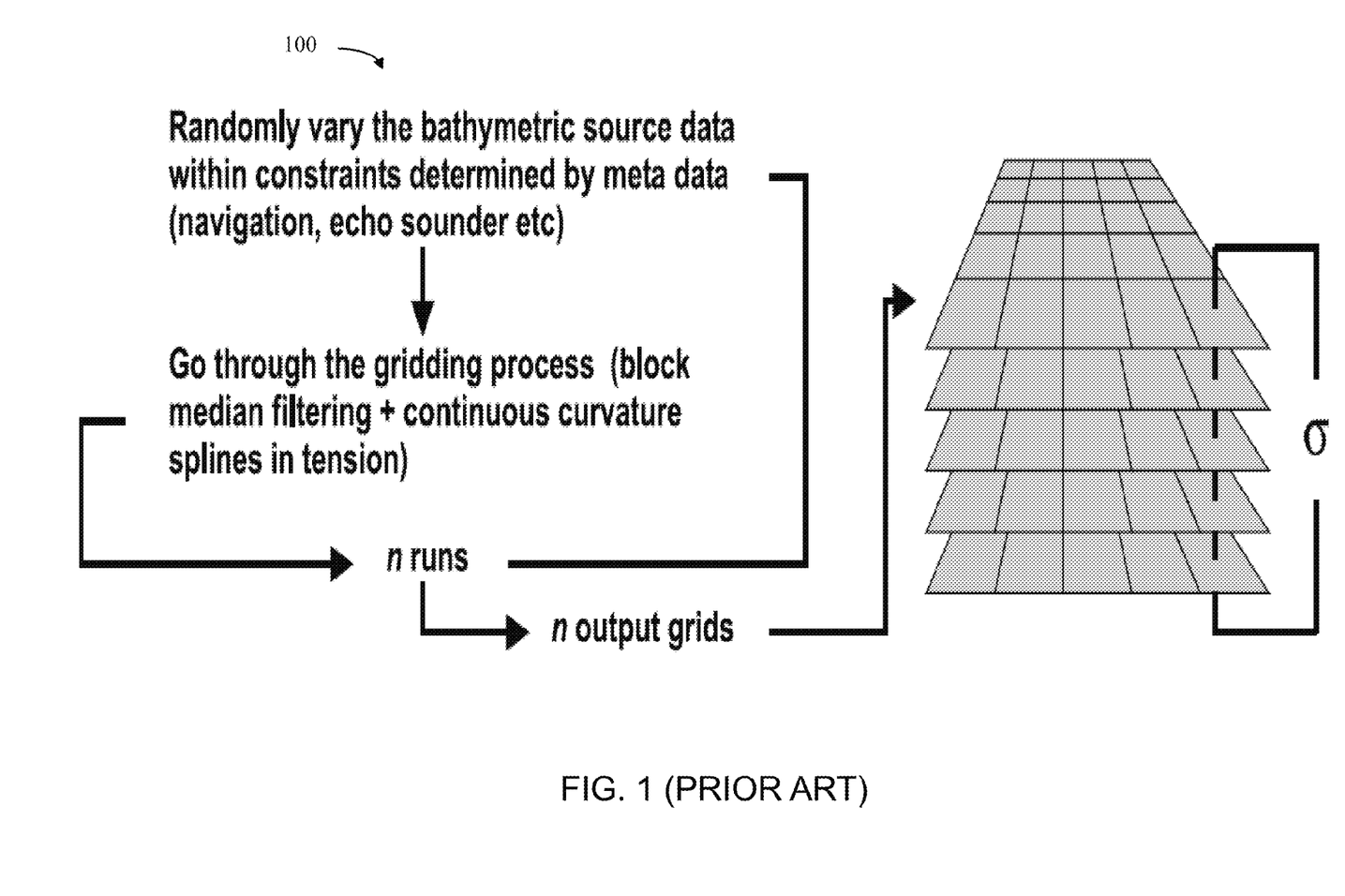
FIG. 1 (PRIOR ART) is a graphical flowchart of the method of calculating uncertainty of the prior art.
Figure 2:
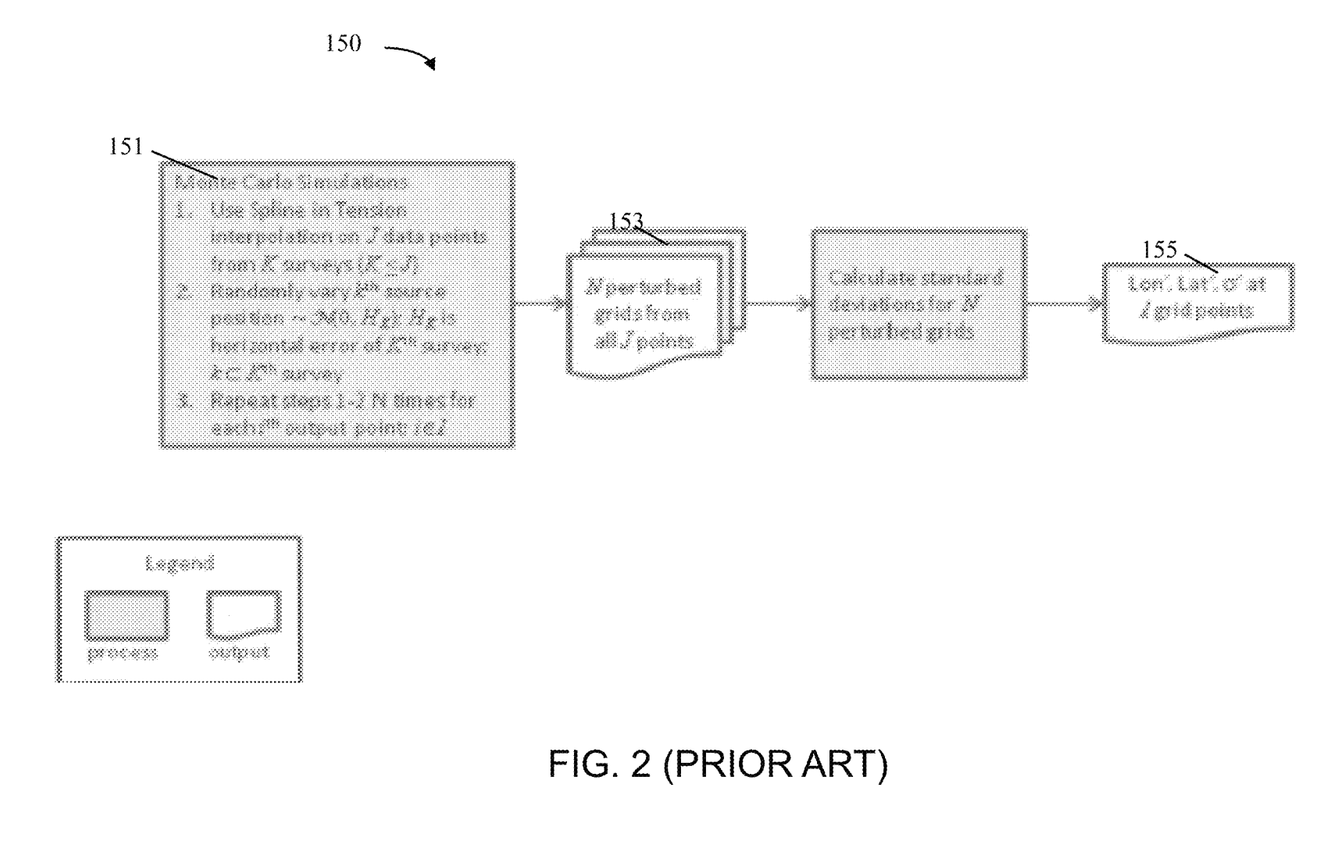
FIG. 2 (PRIOR ART) is a flowchart of the method of calculating uncertainty of the prior art revised to indicate notation used herein.

Estimates of uncertainty are becoming a requirement of oceanographic and acoustic models that use bathymetry. Further, bathymetry fusion algorithms that fuse disparate data sets into a single bathymetry surface can require uncertainty estimates of the input data. Still further, International Hydrographic Organization (IHO) standards prescribe that uncertainty be specified for all hydrographic and bathymetric products, with differing level of uncertainty tolerances depending on safety requirements. Ultimately, uncertainty in the bathymetry layer can be used for navigation safety for surface ships and submarine operations. Jakobsson et al., On the effect of random errors in gridded bathymetric compilations, *Journal of Geophysical Research-Solid Earth,* 107: Article 2358, 2002, estimate error on historic data sets based on Monte Carlo simulations where the two-dimensional position of the original data points, the soundings, are randomly perturbed using a normally distributed random number generator (RNG) illustrated in FIG. 1 (PRIOR ART), showing the established Monte Carlo procedure 100 as given originally by Jakobsson. FIG. 2 (PRIOR ART) shows a revised established Monte Carlo procedure 150, revised to match the notation and flow chart conventions used herein, where the number of soundings is J, the number of surveys is K, the horizontal and vertical uncertainties of the $K^{th}$ survey are $H_K$ and $V_K$, the number of Monte Carlo simulations is N, and each loop is denoted by. For the $K^{th}$ survey, the RNG perturbs the position data $\sim \mathcal{N}(0,V_K^2)$. The notation $\sim \mathcal{N}(0,V_K^2)$ means that the quantity follows a normal, or Gaussian, probability distribution with mean 0 and variance $V_K^2$. If the output grids have I grid points, the gridded bathymetry surface is constructed 151 from a conventional minimum curvature spline interpolator for each $n^{th}$ iteration, resulting in N different interpolated bathymetry surfaces 153. The gridded uncertainty estimate is the standard deviation 155 of the N surfaces. Navigation error and the bottom slope can predominantly influence the bathymetric uncertainty estimated from this method. This procedure can be computationally intensive and requires the use of original soundings data.

What are needed are a system and method that can estimate uncertainty in the interpolation/extrapolation of bathymetry data. What are further needed are a system and method that provide a statistically rigorous means for estimation of uncertainty for areas of the seafloor not covered by dedicated surveys or that fall in between point measurement locations, and that are computationally efficient and do not require the use of original soundings data.

SUMMARY

To address the above-stated needs, the present teachings provide a system and method for estimating uncertainty based on a Bayesian network (BN). According to Heckerman, *A Tutorial on Learning with Bayesian Networks,* MICROSOFT® Technical Report, MSR-TR-95-06, March 1995 (revised November 1996), "a Bayesian network is a graphical model that encodes probabilistic relationships among variables of interest." The BN can accommodate missing data and can learn causal relationships, thus it can include probabilistic semantics. A BN can encode uncertain expert knowledge in expert systems.

The present teachings can provide a computationally efficient method for estimating bathymetric uncertainty for historical gridded bathymetry data sets. Uncertainty estimates are needed when data are stored in the Bathymetric Attributed Grid files, which require both bathymetry and uncertainty. An exemplary embodiment of the present teachings, the Digital Bathymetry Data Base, Variable Resolution Uncertainty Expert System (DUES), is based on a BN to provide a computationally efficient method for determining uncertainty in, for example, but not limited to, the Navy's Digital Bathymetric Data Base-Variable Resolution (DBDB-V). In the present teachings, the Monte Carlo technique can be used on representative sets of soundings data to obtain the conditional probability densities (CPDs) necessary for statistical inference. Causal relationships of navigation error and bottom slope to bathymetric uncertainty can be quantified by CPD's.

The computer-based system for estimating uncertainty can include, but is not limited to including, an automated conditional probability density processor computing conditional probability densities of bathymetric uncertainty due to navigation error and bottom slope using a Monte Carlo technique on representative sets of soundings data from the bathymetry database. The system can also include an automated BN trainer processor using the Monte Carlo results to train the BN to provide the causal relationships of navigation error and bottom slope to bathymetric uncertainty, producing a histogram of bathymetric uncertainty from the Bayesian Network of the uncertainty for an area similar to the training set area, and an automated uncertainty estimator estimating the uncertainty based on the histogram produced by the Bayesian Network, providing the uncertainty estimates to an upgraded bathymetry database.

The method for estimating uncertainty can include, but is not limited to including, the steps of obtaining conditional probability densities of bathymetric uncertainty due to navigation error and bottom slope using a Monte Carlo technique on representative sets of soundings data from the bathymetry database, using the Monte Carlo results to train the BN to provide the causal relationships of navigation error and bottom slope to bathymetric uncertainty, producing a histogram of bathymetric uncertainty from the Bayesian Network of the uncertainty for an area with similar bottom topography to the training set area, and estimating the uncertainty based on the histogram produced by the Bayesian Network. Similarity is quantified, for example, but not limited to, by statistical hypothesis testing of the distributions of the bottom slopes in one area versus the training area such that the null hypothesis cannot be rejected due to lack of evidence for rejection at a 99% percentile confidence level. The expert system of the present teachings is fundamentally different from established Monte Carlo procedure because statistical inference is used to estimate uncertainty whereas Monte Carlo uses standard deviation from simulations, and while Monte Carlo simulations can be used for training, Monte Carlo simulation is not the means by which the uncertainties are estimated. Further, original soundings are not required to estimate the uncertainty.

DETAILED DESCRIPTION

The problems set forth above as well as further and other problems are solved by the present teachings. These solutions and other advantages are achieved by the various embodiments of the teachings described herein below.

In the present embodiment, an established Monte Carlo technique can be used on representative sets of soundings data to obtain the CPD's necessary for the statistical inference. The BN can then produce a histogram of this uncertainty estimate for an area given the navigation errors used to survey the region and bottoms slopes that are present. A final estimate of uncertainty can be calculated by combining a variance estimate, such as, for example, but not limited to, mean plus one standard deviation or a quantile, from the BN's output histogram with the vertical error, $V_K$, under the assumption of statistical independence between the two. The statistic can be user-supplied.

Figure 3:
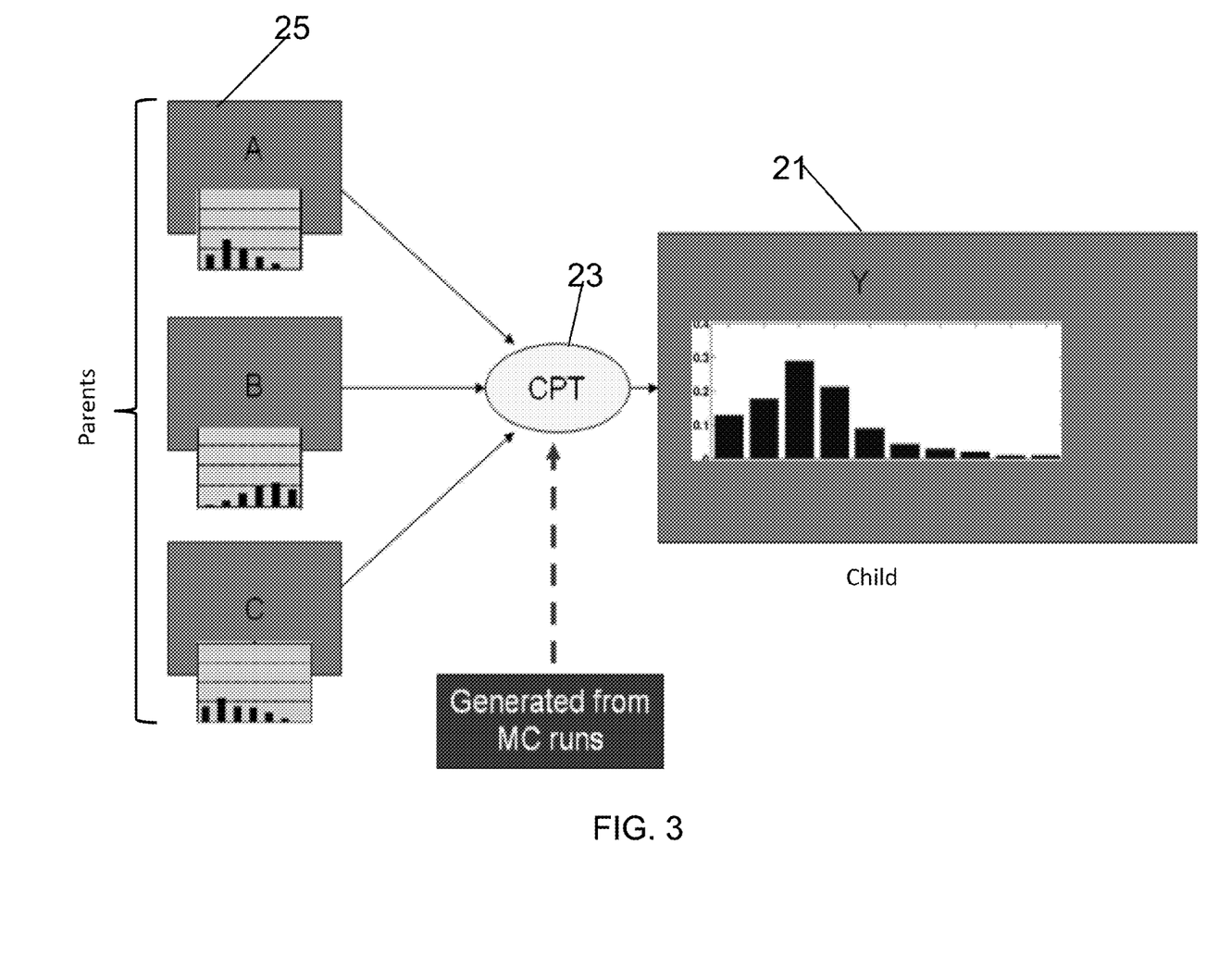
FIG. 3 is a schematic block diagram of the creation and usage of CPTs generated from a Monte Carlo process.

Referring now to FIG. 3, a BN adaptation can exploit the similarity of how errors propagate. Nodes A, B, and C are parents 25 of child node Y 21, meaning that A, B and C collectively cause effect Y. In this case, conditional probability table (CPT) 23 was created (i.e. the BN was trained) from Monte Carlo simulations. Causal relationships between, for example, but not limited to, navigation error and bottom slope to bathymetric uncertainty can be defined. The Monte Carlo technique can be used on sample data to train the BN and generate CPDs. Conditional probabilities can link parent nodes (A, B, C, etc.) 25 to child node Y 21. CPT's 23 can store conditional probabilities. Parent nodes 25 are histograms of their variables. Child histogram is a weighted sum of the conditional probabilities.

Figure 4:
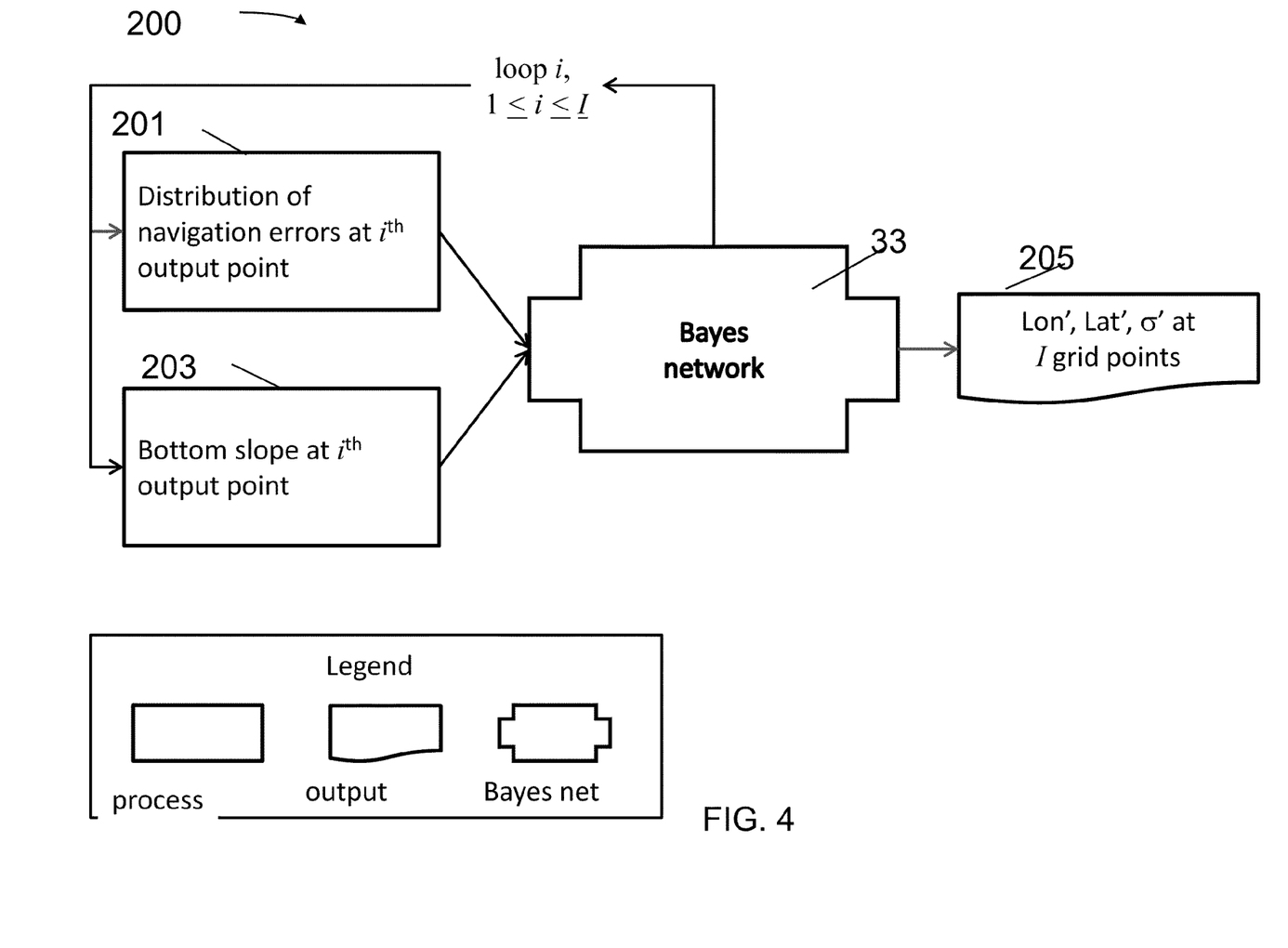
FIG. 4 is a schematic block diagram of an exemplary uncertainty expert system.

Referring now to FIG. 4, the conceptual flow 200 of an exemplary uncertainty expert system is shown. Distribution of navigation errors 201 and bottom slope 203, both at the $i^{th}$ output point, are supplied to Bayes network 33. The uncertainty component from navigation error and bottom slope is estimated for each $i^{th}$ point on output grid 205 with x total points through statistical inference of Bayes network 33. Interpolated longitudes and latitudes are given by lon' and lat'.

Figure 5:
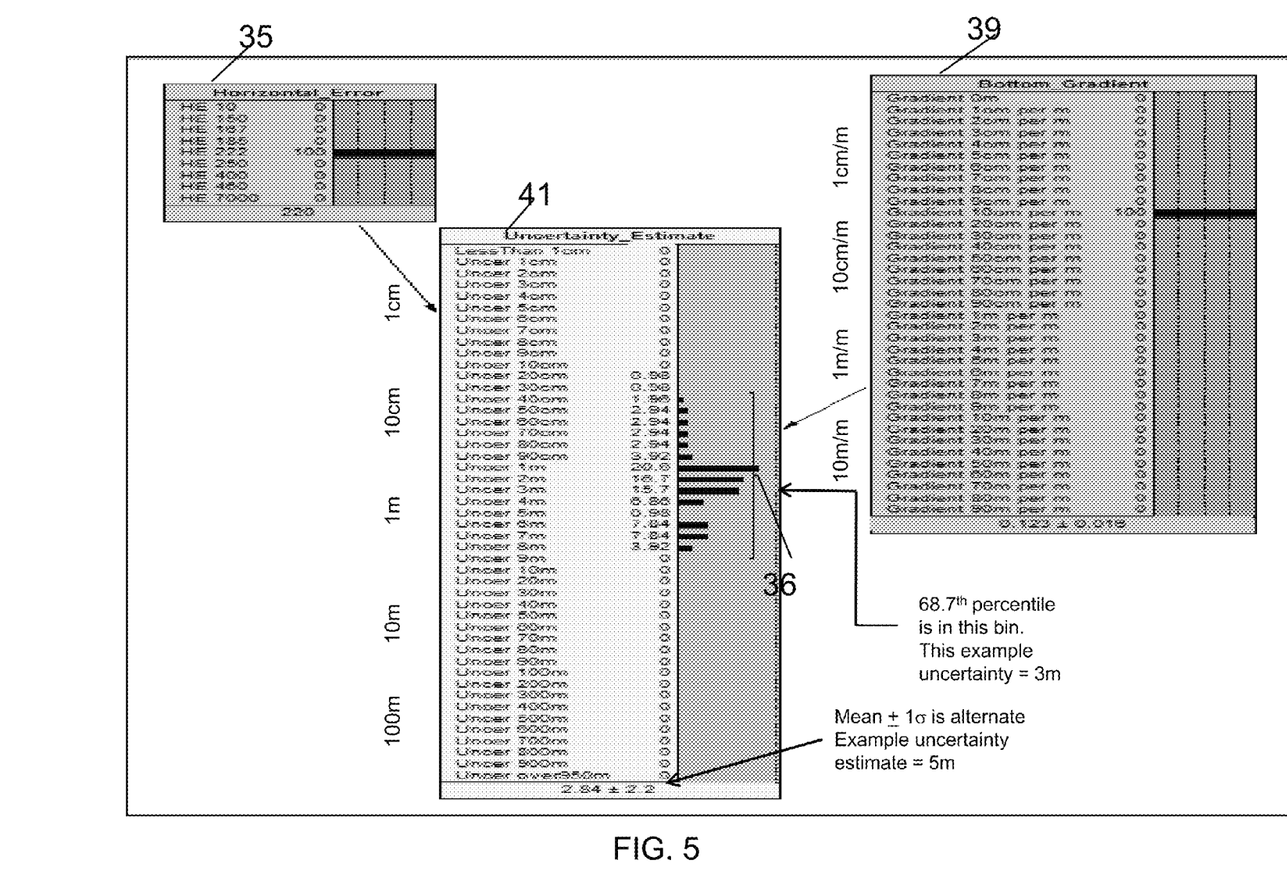
FIG. 5 is a graphical user interface product of BN topology.
Figure 6:
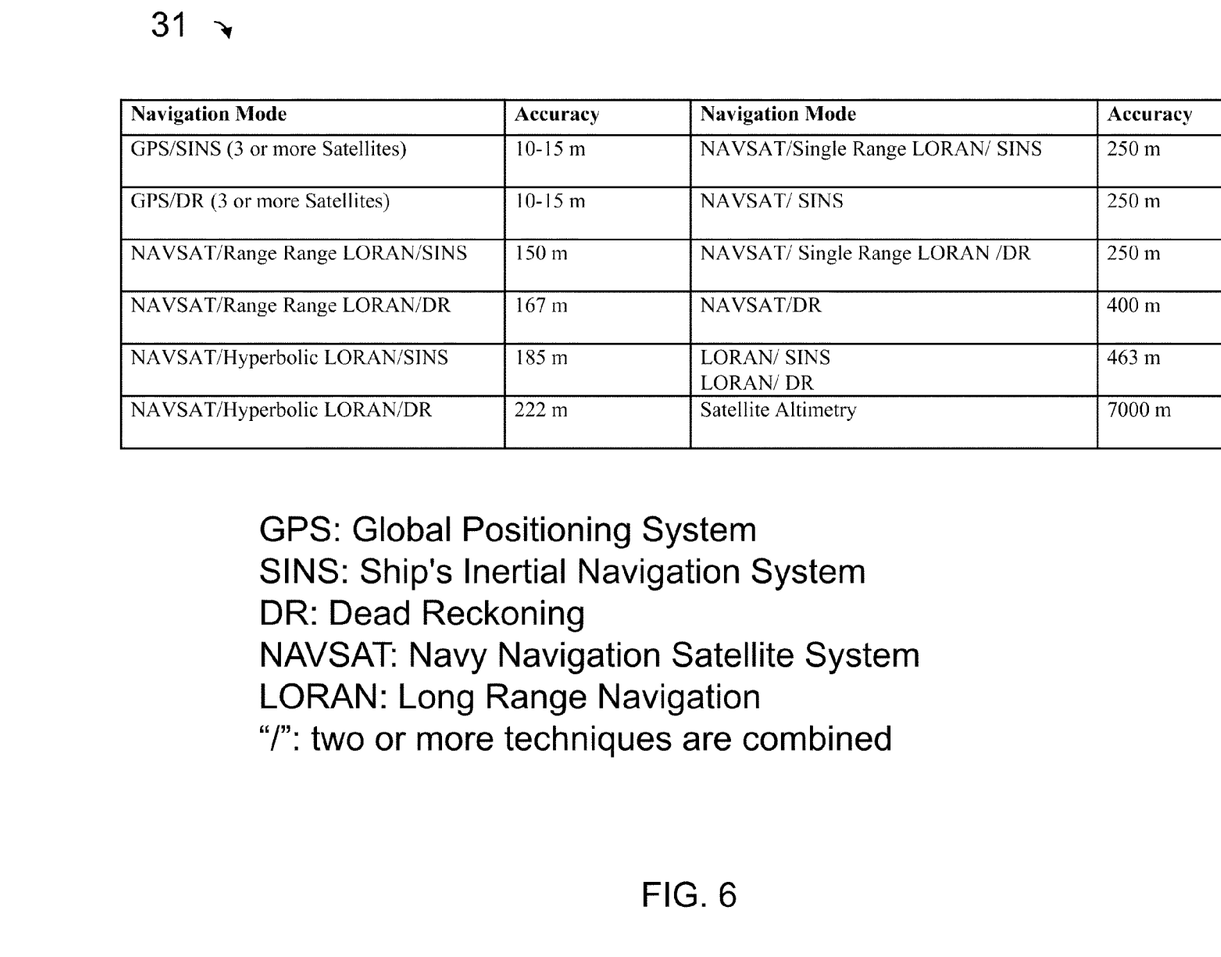
FIG. 6 is a table of horizontal error categories.

Referring now to FIGS. 5 and 6, BN topology is shown as displayed by, for example, but not limited to, NETICA® software graphical user interface (FIG. 5) for training a BN and tabulated horizontal error categories 31 (FIG. 7) are shown as used in an exemplary BN. The process for training a BN by the Monte Carlo technique can include, but is not limited to including, the steps of tabulating applicable data, for example, horizontal errors 35, performing the Monte Carlo procedure on error categories 31 (FIG. 6), creating a 2D histogram 36 of possible uncertainties for a CPT, and repeating for different training areas. Horizontal errors 35 (FIG. 5) follow navigation errors. Bottom gradient 39 (FIG. 5) and uncertainty estimate 41 (FIG. 5) nodes follow a logarithmic binning scheme.

Figure 7:
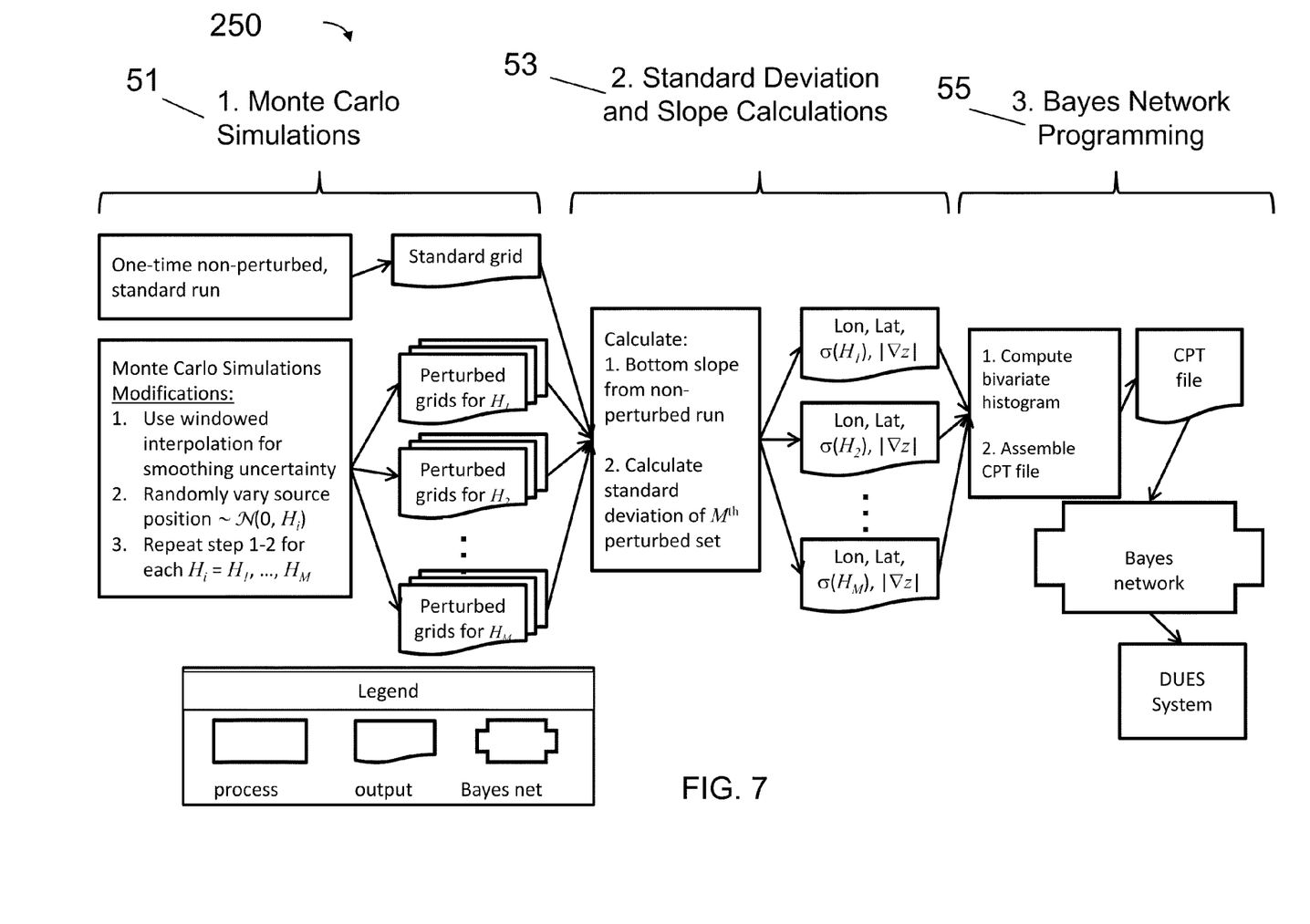
FIG. 7 is a schematic block diagram of the BN training process of the present embodiment.

Referring now to FIG. 7, a high level view of an exemplary BN training process is shown. The figure illustrates computation of the standard deviation as modified by the present teachings and use of these results to construct the CPTs for the BN. Shown is the process of assessing uncertainty and training a Bayes network from Monte Carlo simulations. The process includes, but is not limited to, the steps of perturbing 51 sounding positions "n" times, where there is a Gaussian distribution of perturbed positions and where horizontal/navigation positioning error is 1 s of the Gaussian perturbation, obtaining 53 the standard deviation of the "n" bathymetry layers, increasing horizontal error by a predefined step size and repeating, and creating 55 CPT of standard deviations with horizontal error and slope using bivariate histogram at the end of the simulations.

Figure 8:
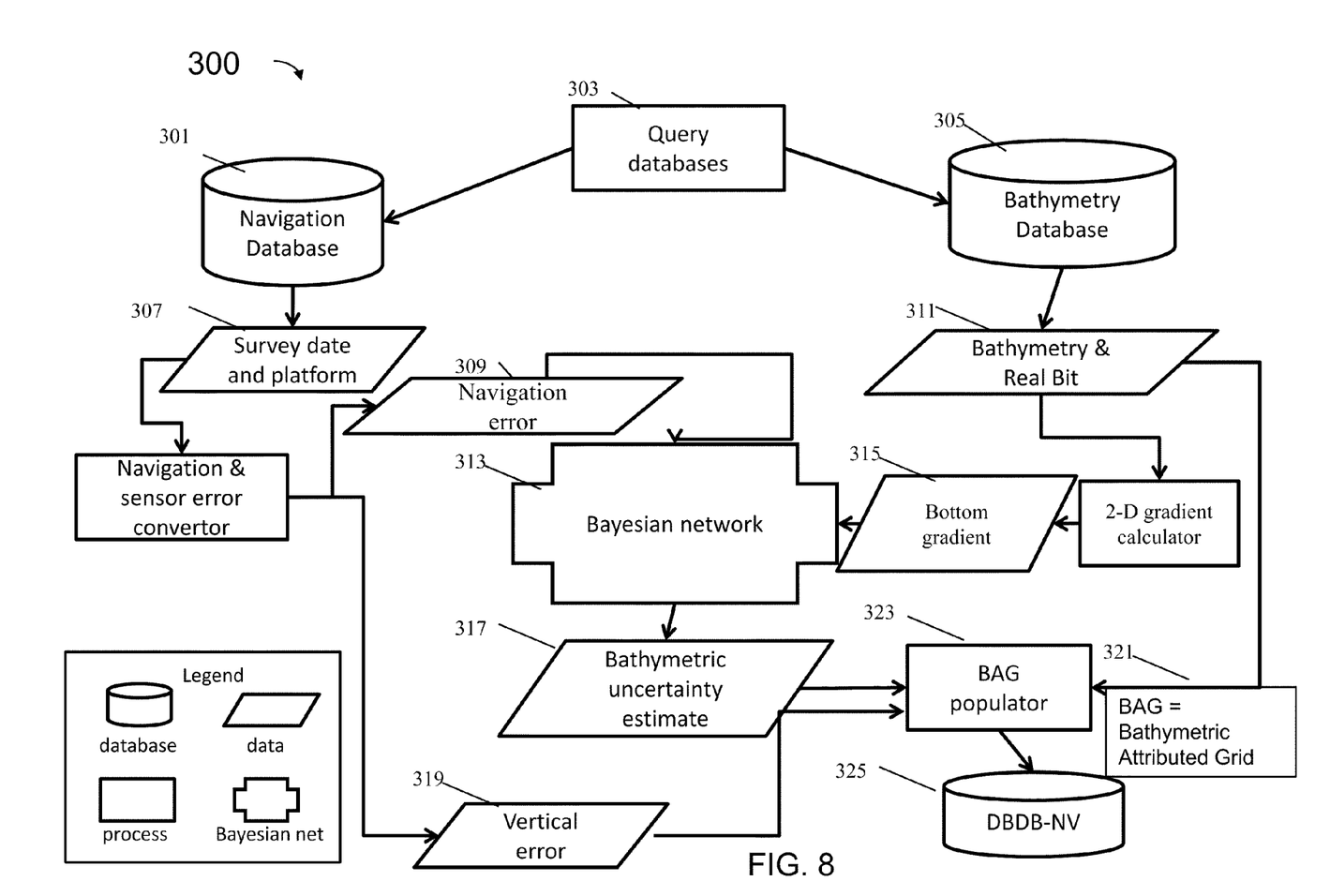
FIG. 8 is a schematic block diagram of the present embodiment in the context of a system that queries navigation and bathymetry databases and populates a bathymetry database with uncertainties.

Referring now to FIG. 8, an exemplary implementation of the present teachings is shown in which the BN is integrated into larger system 300, for example, the DUES system. First, a region of interest for an uncertainty estimate is defined, followed by a query 303 of, for example, but not limited to, available navigation 301 and bathymetry data 305 for the area. The query can be made manually or automatically. In the present embodiment, metadata codes 307, which indicate survey era and platform used, are read from the navigation data 301 to obtain the types of navigation and sonar systems used for the track lines in the area. The fractional lengths of the track lines with like error, that is, errors in the same error category, are then calculated. The sums of all track lengths with a like error divided by the total of all track lengths become the weights for the horizontal error 309 node for BN 313. The present embodiment extracts bathymetry data 305 from the same area to obtain the magnitude of the bottom gradient and "real-bit" flags 311 at each grid point; the latter indicates if the grid point is calculated from actual soundings (real-bit flag=1) or if it is determined purely from interpolation (real-bit flag=0). The present embodiment loops through each grid point, assigns bottom gradient 315 to the appropriate bin of the BN's Bottom Gradient node, and extracts the resultant histogram. Calculation of a user-specified quantile (median, $68.7^{th}$ percentile, etc.) or other statistic (mean, mean plus one standard deviation, etc.) for this histogram provides the intermediate uncertainty 317. The final uncertainty estimate is obtained by first adding the square of the intermediate uncertainty 317 to the square of the vertical error estimate 319. The square root of the sum is then the final uncertainty estimate at that grid point if real-bit flag=1. If real-bit flag=0, the square root is multiplied by a user-defined coefficient to magnify the uncertainty estimate 317 to account for higher uncertainty in purely interpolated values. The present embodiment finally combines the gridded bathymetry 321 and uncertainty layers into database 325 used to populate 323, for example, an upgraded DBDB-V database. Vertical error 319 can be estimated from a large number of factors, including uncertainties of the sonar, sound speed profile, ship positioning vertically, ship pitch and roll, etc.

Figure 9:
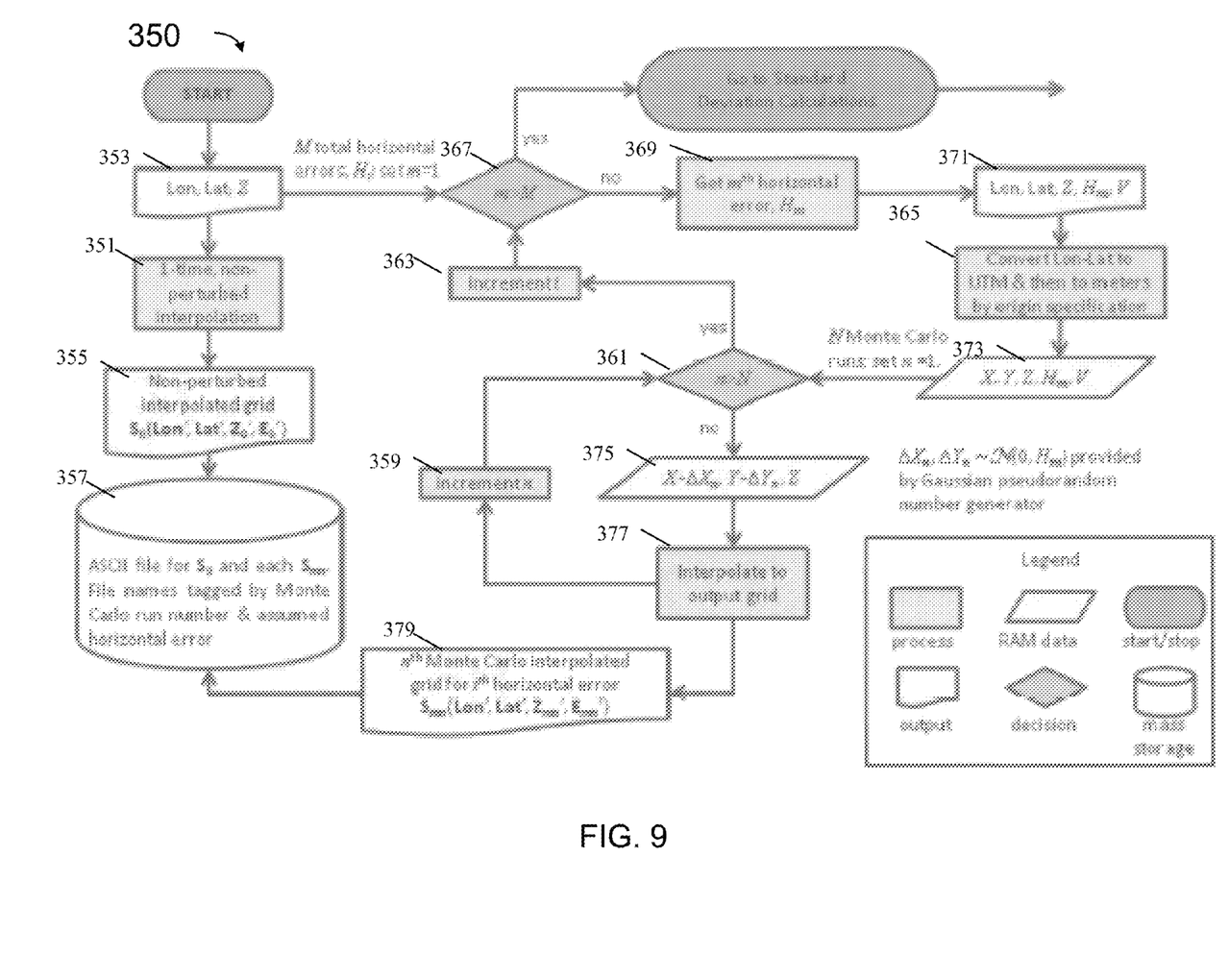
FIG. 9 is a flowchart of the process of Monte Carlo simulations of the present embodiment introduced in FIG. 7.

Referring now primarily to FIG. 9, a method 350 for Monte Carlo simulations 51 (FIG. 7) can include, but is not limited to including, the steps of calculating 351 a one-time non-perturbed bathymetry to be used for later calculations of bottom slope. For this unperturbed grid, matrix S0 355 holds the interpolated longitude (Lon') and latitude (Lat') and depths (Z0') 353. The bold face means that the quantity is a vector or matrix. In the present embodiment, there are M different horizontal error categories for which the BN needs to be trained (loop 367). Method 350 can include the step of obtaining 369 the $m^{th}$ horizontal error, and, for each $m^{th}$ horizontal uncertainty $H_m$ category (m=1, ..., M), creating files 371, for example, but not limited to, in ASCII format, for the longitude, latitude, depth, and horizontal uncertainty $H_m$ to be used as input files for the Monte Carlo simulations. In the present embodiment, for each category, there are N simulations (loop 361) in which the locations 373 of the sounding points (or gridded points acting as sounding points) are perturbed from the original position (in meters after conversion 365 to universal transverse mercator (UTM) projection and specification of a UTM origin in the grid) by amounts $\Delta X_n$ in the east-west direction and $\Delta Y_n$ in the north-south direction, incrementing 363 i through each iteration of loop 367. Positional perturbations $\sim N(0, H_m)$ are provided by Gaussian pseudorandom number generator. For each $n^{th}$ simulation (n=1, ..., N) (loop 359), method 350 can include the step of interpolating 377 the data points 375 to provide bathymetry surface, $Z_{mn}'$. Interpolated positions 379 are then converted from UTM to the interpolated longitude and latitude. The matrix $S_{mn}'$ is the vector of Lon', Lat', and $Z_{mn}'$. Method 350 can include the step of storing each $S_{mn}'$ to file 357, for example, but not limited to, an ASCII text file, with the navigation uncertainty category, m, and the Monte Carlo loop number, n, stored in the file name in file 357. The interpolation algorithm can be, but is not limited to being, a windowed linear smoothing technique documented by Plant et al., I. A., Analysis of the scale of errors in nearshore bathymetric data, *Marine Geology*, 191, pp. 71-86, 2002.

In the present embodiment, N=100 Monte Carlo iterations are performed for each $m^{th}$ set of simulations; the set of one hundred Monte Carlo simulations are then repeated M times for each horizontal error category in FIG. 5 in order to fully populate the CPT of the BN. In the present embodiment, each sounding is assumed to have the same probability distribution of horizontal error so that a statistical distribution for bathymetric uncertainty for a range of horizontal errors can be obtained. The actual data are assumed to have the horizontal errors in order to associate horizontal errors and slope to an intermediate uncertainty.

Figure 10:
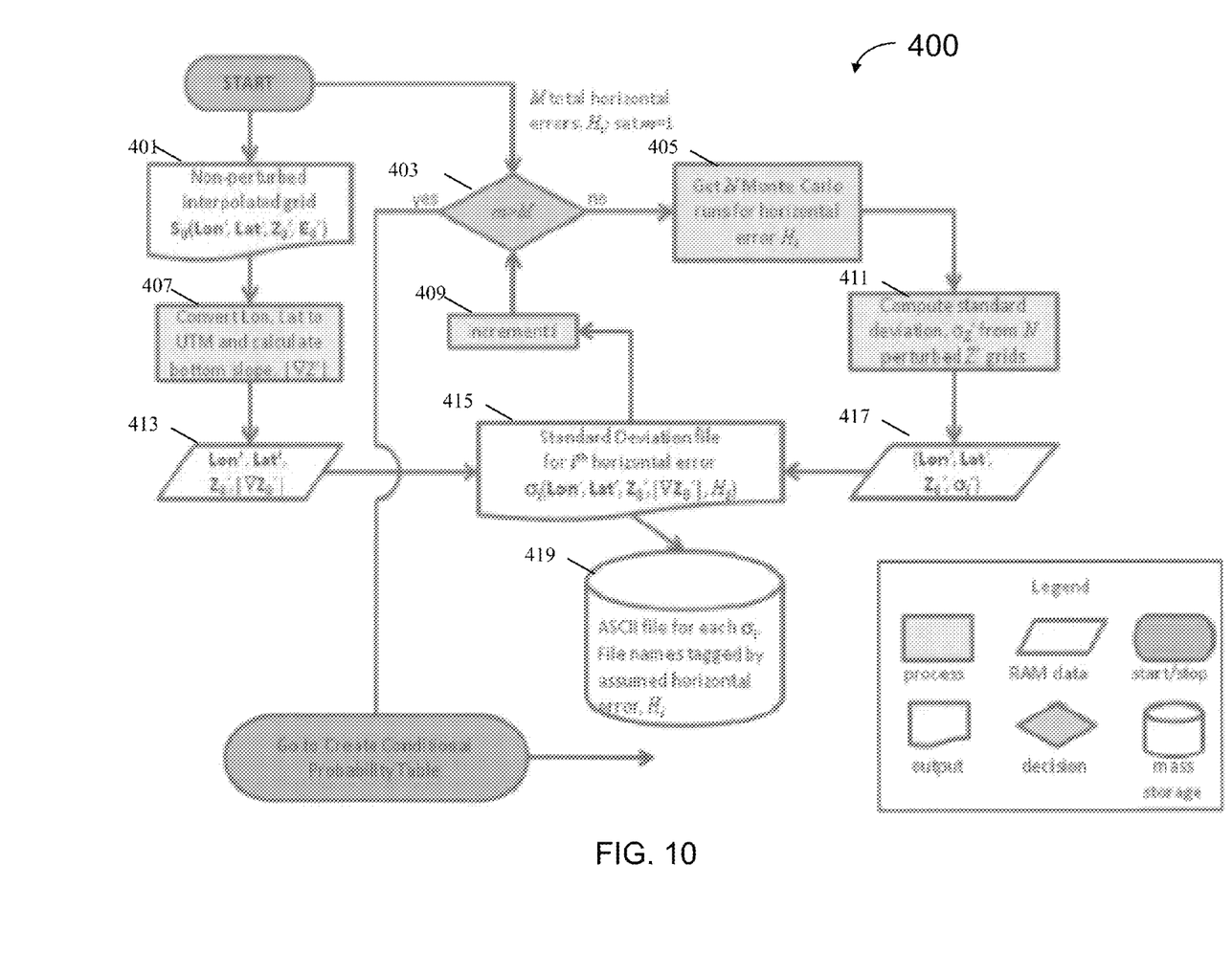
FIG. 10 is a flowchart of the process of calculating standard deviations of the present embodiment introduced in FIG. 7.

Referring now to FIG. 10, after completion of the Monte Carlo simulations 51 (FIG. 7), method 400 for computing 53 (FIG. 7) the gridded standard deviation of the bathymetry can include the steps of, for each $m^{th}$ horizontal uncertainty category (loop 403), obtaining 405 N Monte Carlo runs for horizontal error $H_i$, and computing 411 $\sigma_m'$, at each $i^{th}$ output grid point (loop 409) from the N bathymetry grids. Method 400 can also include the step of calculating 407 the gridded bottom slope from the unperturbed bathymetry ($S_0$) file 401 using standard methodologies, for example, but not limited to, those in Zhou and Liu, Error Analysis on Grid-Based Slope and Aspect Algorithms, *Photogrammetric Engineering & Remote Sensing*, Vol. 70, No. 8, pp. 957-962, August 2004, with UTM positions and linear extrapolation of the computational edges. Method 400 can include the step of storing the gridded standard deviation 417 and bottom slopes 413 to files 415, for example, but not limited to, ASCII files 419 which can contain the interpolated longitude, latitude, and bathymetry, the Monte Carlo standard deviation, and the slope, given by matrix $E_m$.

Figure 11:
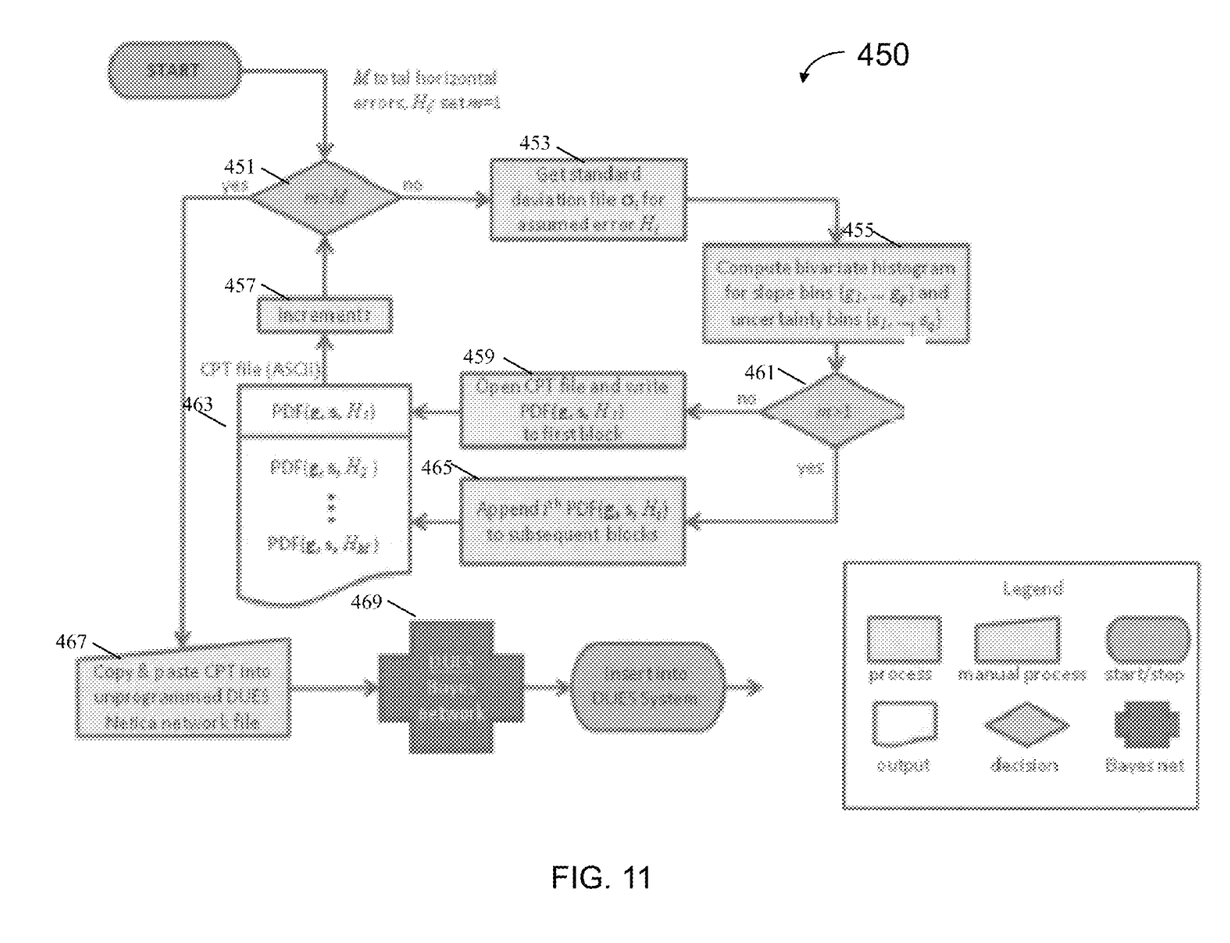
FIG. 11 is flowchart of the BN programming of the present embodiment introduced in FIG. 7.

Referring now to FIG. 11, method 450 for Bayes net training 55 (FIG. 7) can include, but is not limited to including, the step of, for each m horizontal error (loop 451), accessing 453 Monte Carlo uncertainties and bathymetric slopes from the standard deviation file 357 (FIG. 9) for the first horizontal error category, $H_i$. Method 450 can include the step of computing 455, using logarithmic binning schemes for both the bottom slopes and bathymetry uncertainties, a bivariate histogram (i.e., three-dimensional histogram) using, for example, but not limited to, the "hist3" function of the MATLAB® Statistics Toolbox, with slopes (let there be $g_1, \ldots, g_p$ slope bins, given by vector g) and intermediate bathymetry uncertainty (let there be $s_1, \ldots, s_q$ uncertainty bins, given by vector s), respectively, indexing the row and column bins of the bivariate histogram. Method 450 can include the steps of, when m≤1 (loop 461), normalizing and writing 459 the histogram to file 463, for example, but not limited to, an ASCII file, incrementing 457 a PCT index, and repeating steps 451, 453, 455, and 459 for subsequent horizontal uncertainties 35 (FIG. 5). Method 450 can further include the step of, when m>1 (loop 461), appending 465 the resultant normalized bivariate histograms to file 463. Method 450 can still further include the step of opening 467 Bayesian network *.neta file 469 in a NETICA® GUI, and displaying the CPT for the "Uncertainty Estimate" node. The CPT can, for example, be copied from the ASCII file into a spreadsheet-like data display for the CPT in the GUI. The CPT can be already arranged to have the same stacked structure as the file 463.

Figure 12:
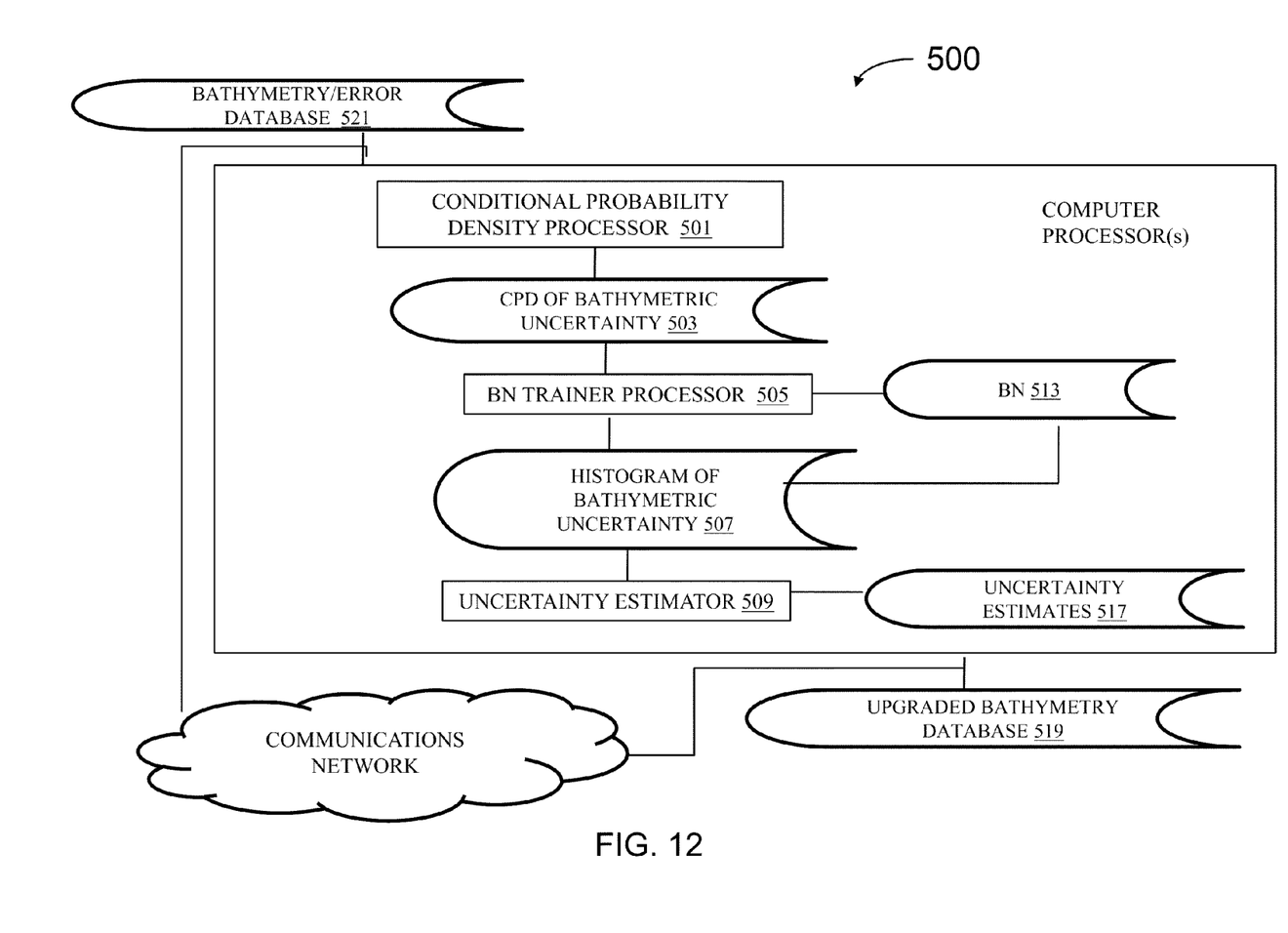
FIG. 12 is a schematic block diagram of the system of the present embodiment.

Referring now to FIG. 12, system 500 for estimating uncertainty can include, but is not limited to including, conditional probability density processor 501 obtaining conditional probability densities 503 of bathymetric uncertainty due to navigation error and bottom slope using a Monte Carlo technique on representative sets of soundings data from bathymetry database 521. System 500 can also include BN trainer processor 505 using the Monte Carlo results to train BN 513 to provide the causal relationships of navigation error and bottom slope to bathymetric uncertainty, producing histogram 507 of bathymetric uncertainty from BN 513 of the uncertainty for an area similar to the training set area, and uncertainty estimator 509 estimating the uncertainty based on histogram 507 produced by BN 513, providing uncertainty estimates 517 to updated bathymetry database 519.

The present embodiment is directed, in part, to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 4, 7, 8, 9, 10, and 11, methods 200, 250, 300, 350, 400, and 450 can be, in whole or in part, implemented electronically. Signals representing actions taken by elements of apparatus 500 (FIG. 12) and other disclosed embodiments can travel over at least one live communications network. Control and data information can be electronically executed and stored on at least one computer-readable medium. Components of the apparatus can be implemented to execute on at least one computer node in at least one live communications network. Common forms of a computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

The invention claimed is:

1. A computer-implemented method for estimating uncertainty in a bathymetry database comprising:
    obtaining, by a special-purpose computer, conditional probability densities of bathymetric uncertainty due to horizontal error and bottom slope using a Monte Carlo technique on representative sets of soundings data from the bathymetry database, the representative sets being associated with a training set area;
    training, by the special-purpose computer, a Bayesian Network to provide causal relationships between the horizontal error and the bottom slope and the bathymetric uncertainty based on the conditional probability densities;
    creating, by the special-purpose computer, a first histogram of the bathymetric uncertainty from the Bayesian Network for an area similar to the training set area; and
    estimating, by the special-purpose computer, an uncertainty based on the first histogram.

2. The method as in claim 1 wherein estimating comprises computing, by the special-purpose computer, a statistical quantity based on the histogram.

3. The method as in claim 1 wherein training the Bayesian Network comprises:
    (a) perturbing, by the special-purpose computer, positions of the sounding data a pre-selected number of times;
    (b) obtaining, by the special-purpose computer, standard deviations of the pre-selected number of bathymetry layers from the perturbed positions;
    (c) increasing, by the special-purpose computer, the horizontal error by a predefined step size and repeating steps (a) and (b); and
    (d) creating, by the special-purpose computer, a conditional probabilities table of the standard deviations.

4. An automated method for providing uncertainty estimates to a bathymetry database comprising:
    defining, by a special-purpose computer, a region of interest for an uncertainty estimate;
    accessing, by the special-purpose computer, navigation data and bathymetry data for the region of interest;
    obtaining, by the special-purpose computer, track lines in the region of interest based on the navigation data;
    calculating, by the special-purpose computer, fractional lengths of the track lines with like errors;
    computing, by the special-purpose computer, weights for a horizontal error node based on the sums of the track lengths with the like errors divided by the total of the track lengths;
    extracting, by the special-purpose computer, bathymetry data from the region of interest to obtain the magnitude of the bottom gradient;
    assigning, by the special-purpose computer, the bottom gradient to a bin of a bottom gradient node;
    providing, by the special-purpose computer, the horizontal error node and the bottom gradient node to the Bayesian Network;
    extracting, by the special-purpose computer, a histogram from the Bayesian Network based on the horizontal error node and the bottom gradient node;
    calculating, by the special-purpose computer, an intermediate uncertainty based on a statistic of the histogram;
    calculating, by the special-purpose computer, a final uncertainty estimate based on adding the square of the intermediate uncertainty to the square of a vertical error estimate and
    computing either the square root of the sum or the square root multiplied by a pre-selected magnification coefficient to account for higher uncertainty in purely interpolated values; and
    populating, by the special-purpose computer, a bathymetry database with the bathymetry data and the final uncertainty estimate.

5. The method as in claim 4 wherein the vertical error estimate comprises uncertainties of sonar, sound speed profile, ship positioning vertically, and ship pitch, roll, heave and draft.

6. An automated system for estimating uncertainty in an electronic bathymetry database comprising:
    an automated conditional probability density processor obtaining conditional probability densities of bathymetric uncertainty due to navigation error and bottom slope using a Monte Carlo technique on representative sets of soundings data from the bathymetry database, the representative sets being associated with a training set area;
    an automated Bayesian Network trainer processor training a Bayesian Network to provide the causal relationships of the navigation error and the bottom slope to the bathymetric uncertainty based on the conditional probability densities, said trainer processor producing a histogram of the bathymetric uncertainty from the Bayesian Network for an area similar to the training set area; and
    an automated uncertainty estimator estimating an uncertainty based on the output histogram.

7. The system as in claim 6 wherein said automated uncertainty estimator estimates the uncertainty based a statistical quantity from the output histogram.

8. The system as in claim 6 wherein said an automated Bayesian Network trainer processor training (a) perturbs positions of the sounding data a pre-selected number of times, (b) obtains standard deviations of the pre-selected number of bathymetry layers from the perturbed positions, (c) increases the horizontal error by a predefined step size and repeats (a) and (b); and (d) creates a conditional probabilities table of the standard deviations.

9. A computer software system comprising computer code stored on non-transitory computer readable media for estimating uncertainty in an electronic bathymetry database, said computer code comprising:
    obtaining conditional probability densities of bathymetric uncertainty due to navigation error and bottom slope using a Monte Carlo technique on representative sets of soundings data from the bathymetry database, the representative sets being associated with a training set area;

training a Bayesian Network to provide the causal relationships of the navigation error and the bottom slope to bathymetric uncertainty based on the conditional probability densities;

producing a histogram of the bathymetric uncertainty from the Bayesian Network for an area similar to the training set area; and estimating an uncertainty based on the histogram.

10. The computer system as in claim 9 wherein estimating comprises computing a statistical quantity based on the histogram.

11. The computer system as in claim 9 wherein said computer code comprises:
(a) perturbing positions of the sounding data a pre-selected number of times;
(b) obtaining standard deviations of the pre-selected number of bathymetry layers from the perturbed positions;
(c) increasing the horizontal error by a predefined step size and repeating steps (a) and (b); and
(d) creating a conditional probabilities table of the standard deviations.

12. A computer system for providing uncertainty estimates to a bathymetry database comprising:
a bathymetry database having navigation error data and bathymetry data for a region of interest;
a Bayesian Network trainer processor obtaining track lines in the region of interest based on the navigation data, calculating fractional lengths of the track lines with like errors, computing weights for a horizontal error node based on the sums of the track lengths with the like errors divided by the total of the track lengths, extracting bathymetry data from the region of interest to obtain the magnitude of the bottom gradient, assigning the bottom gradient to a bin of a bottom gradient node, and providing the horizontal error node and the bottom gradient node to the Bayesian Network, the Bayesian Network providing a histogram based on the horizontal error node and the bottom gradient node; and
an uncertainty estimator calculating an intermediate uncertainty based on a statistic of the histogram, calculating a final uncertainty estimate based on adding the square of the intermediate uncertainty to the square of a vertical error estimate and computing either the square root of the sum or the square root multiplied by a pre-selected magnification coefficient to account for higher uncertainty in purely interpolated values, and populating a bathymetry database with the bathymetry data and the final uncertainty estimate.

13. The computer system as in claim 12 wherein the vertical error estimate comprises uncertainties of sonar, sound speed profile, ship positioning vertically, and ship pitch, roll, heave and draft.

14. A computer software system comprising computer code stored on non-transitory computer readable media for providing uncertainty estimates to a bathymetry database, said computer code comprising:
defining a region of interest for an uncertainty estimate;
accessing navigation data and bathymetry data for the region of interest;
obtaining track lines in the region of interest based on the navigation data;
calculating fractional lengths of the track lines with like errors;
computing weights for a horizontal error node based on the sums of the track lengths with the like errors divided by the total of the track lengths;
extracting bathymetry data from the region of interest to obtain the magnitude of the bottom gradient;
assigning the bottom gradient to a bin of a bottom gradient node;
providing the horizontal error node and the bottom gradient node to the Bayesian Network;
extracting a histogram from the Bayesian Network based on the horizontal error node and the bottom gradient node;
calculating an intermediate uncertainty based on a statistic of the histogram;
calculating a final uncertainty estimate based on adding the square of the intermediate uncertainty to the square of a vertical error estimate and computing either the square root of the sum or the square root multiplied by a pre-selected magnification coefficient to account for higher uncertainty in purely interpolated values; and
populating a bathymetry database with the bathymetry data and the final uncertainty estimate.

15. The computer software system as in claim 14 wherein the vertical error estimate comprises uncertainties of sonar, sound speed profile, ship positioning vertically, and ship pitch, roll, heave and draft.

* * * * *